United States Patent
Götz et al.

[11] Patent Number: 5,318,337
[45] Date of Patent: Jun. 7, 1994

[54] WINDSCREEN ARRANGEMENT FOR A CONVERTIBLE

[75] Inventors: Hans Götz, Boeblingen; Karl-Heinz Baumann, Bondorf, both of Fed. Rep. of Germany

[73] Assignee: Mercedes-Benz AG, Fed. Rep. of Germany

[21] Appl. No.: 35,506

[22] Filed: Mar. 22, 1993

Related U.S. Application Data

[63] Continuation-in-part of Ser. No. 870,118, Apr. 17, 1992, abandoned, which is a continuation of Ser. No. 758,498, Sep. 19, 1991, abandoned, which is a continuation of Ser. No. 505,458, Apr. 6, 1990, abandoned.

[30] Foreign Application Priority Data

Apr. 28, 1989 [DE] Fed. Rep. of Germany ....... 3914035
Apr. 28, 1989 [DE] Fed. Rep. of Germany ....... 3914036

[51] Int. Cl.⁵ .............................................. B62D 35/00
[52] U.S. Cl. .................................. 296/180.5; 296/85; 296/96.2; 296/180.1; 280/756
[58] Field of Search ...................... 296/85, 96.2, 180.1, 296/180.5; 280/756

[56] References Cited

U.S. PATENT DOCUMENTS 4,557,502 12/1985 Scaduto et al. .................... 280/756

FOREIGN PATENT DOCUMENTS 0316749 5/1989 European Pat. Off. ......... 296/180.5
3732562 11/1988 Fed. Rep. of Germany .

Primary Examiner—Dennis H. Pedder
Attorney, Agent, or Firm—Evenson, McKeown, Edwards & Lenahan

[57] ABSTRACT

The application relates to a windscreen for a convertible with an approximately U-shaped roll bar pivotable about a transverse axis of the vehicle into an approximately horizontal position of rest. The windscreen has a first part pivotable upwards behind a front seat row and a second part horizontally covering the space behind the seat row approximately level with the belt line of the vehicle. The two windscreen parts are connected pivotably to one another with the first part resting on the second part in its position of rest. In order to ensure especially simple actuation the roll bar, movable by means of a convenient drive mechanism, is utilized to shift the first part of the windscreen into its directed operating position.

14 Claims, 3 Drawing Sheets

WINDSCREEN ARRANGEMENT FOR A CONVERTIBLE

This application is a continuation of application Ser. No. 07/870,118, filed Apr. 17, 1992, now abandoned which is a continuation of application Ser. No. 07/758,498, filed Sep. 6, 1991, now abandoned which is a continuation of application Ser. No. 07/505,458, filed Apr. 6, 1990, now abandoned.

BACKGROUND AND SUMMARY OF THE INVENTION

The invention relates to a windscreen for a convertible, with an approximately U-shaped roll bar pivotable about a transverse axis of the vehicle into an approximately horizontal position of rest. The windscreen has a first part pivotable upwards behind a front seat row and a second part horizontally covering the space behind the seat row approximately level with the belt line of the vehicle. The two windscreen parts are connected pivotably to one another with the first part resting on the second part in its position of rest.

An object of the present invention is to design a windscreen arrangement of the type in such a way that its first part can be pivoted upwards into its operating position simply and quickly, without the driver having to leave the vehicle for this purpose.

According to certain preferred embodiments of the invention, in a windscreen of the relevant generic type, this object is achieved by a windscreen arrangement wherein for a convertible, with an approximately U-shaped roll bar pivotable about a transverse axis of the vehicle into an approximately horizontal position of rest, the windscreen having a first part pivotable upwards behind a front seat and a second part horizontally covering a space behind the seat row approximately level with a belt line of the vehicle, the two parts are connected pivotably to one another and the first part resting on the second part in its position of rest, and wherein means are provided for bringing the first part within reach of a person sitting on the front seat by raising the roll bar by means of a convenient drive mechanism.

According to especially preferred advantageous embodiments, the windscreen arrangement includes means for automatically bringing the first part into operative connection with a releasable catch device by raising the roll bar by means of a convenient drive mechanism, said releasable catch device including means for retaining the first part in its swung-up operating position during return movement of the roll bar to its position of rest.

Another object of the present invention is to develop a windscreen of this type in such a way that it can be fastened to the vehicle and removed from it again easily and quickly, without any measures, such as, for example, the provision of special holding devices, having to be taken on the vehicle itself for this purpose.

According to the invention, in a windscreen of the relevant generic type, this last mentioned object is achieved in that the second part can be secured to the roll bar by fastening means and pivoted upwards together with this.

According to a preferred embodiment of the invention, at the same time the outer contour of the second part of the windscreen is matched in its course to the inner contour of the roll bar.

Other objects, advantages and novel features of the present invention will become apparent from the following detailed description of the invention when considered in conjunction with the accompanying drawings.

BRIEF DESCRIPTION OF THE DRAWINGS

FIG. 6 shows a perspective representation of a windscreen which is mounted on the vehicle and the first part of which is pivoted upwards into its operating position, according to a preferred embodiment of the invention, and FIG. 7 shows a representation of the windscreen of FIG. 6 in a state not yet mounted.

DETAILED DESCRIPTION OF THE DRAWINGS

Figure 1:
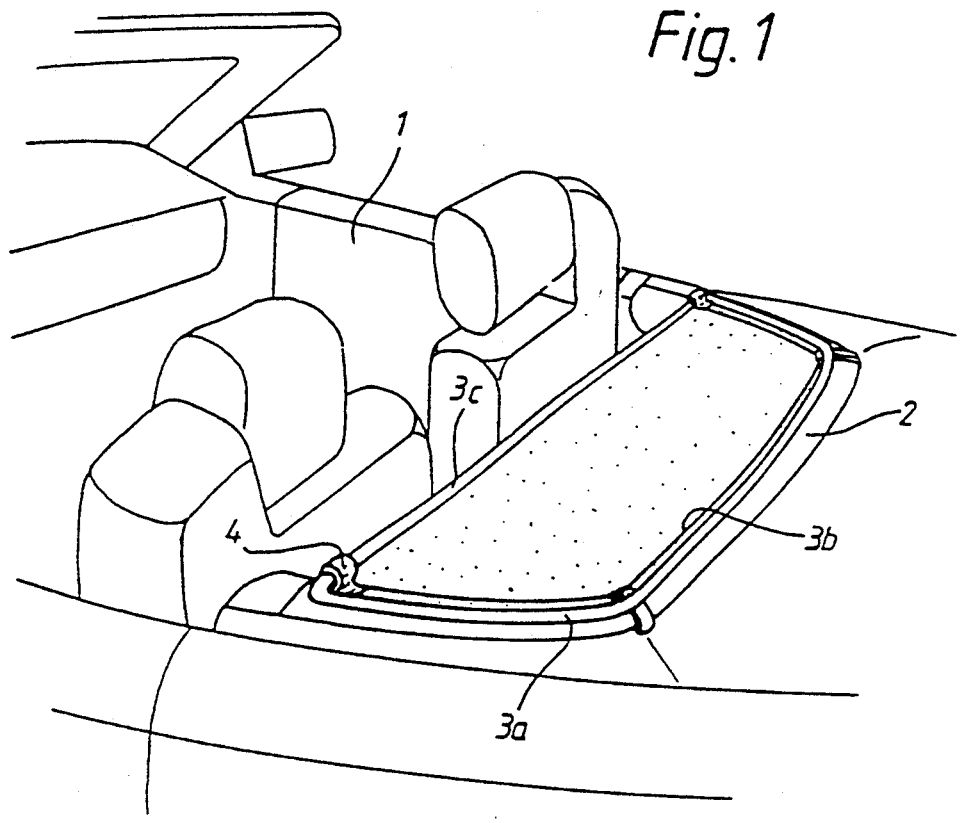
FIG. 1 shows a perspective schematic representation of a windscreen arrangement which is mounted on a passenger motor vehicle and the first part of which is swung down into its position of rest, constructed according to a preferred embodiment of the invention.
Figure 2:
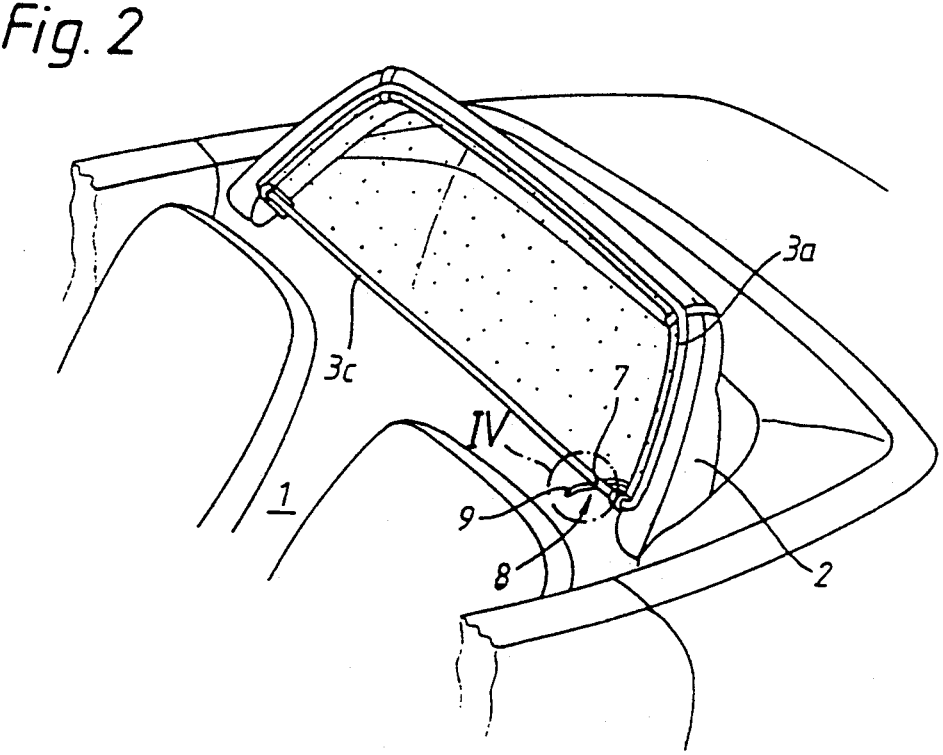
FIG. 2 shows in perspective an intermediate position of the windscreen arrangement of FIG. 1 during the upward pivoting of the roll bar.
Figure 3:
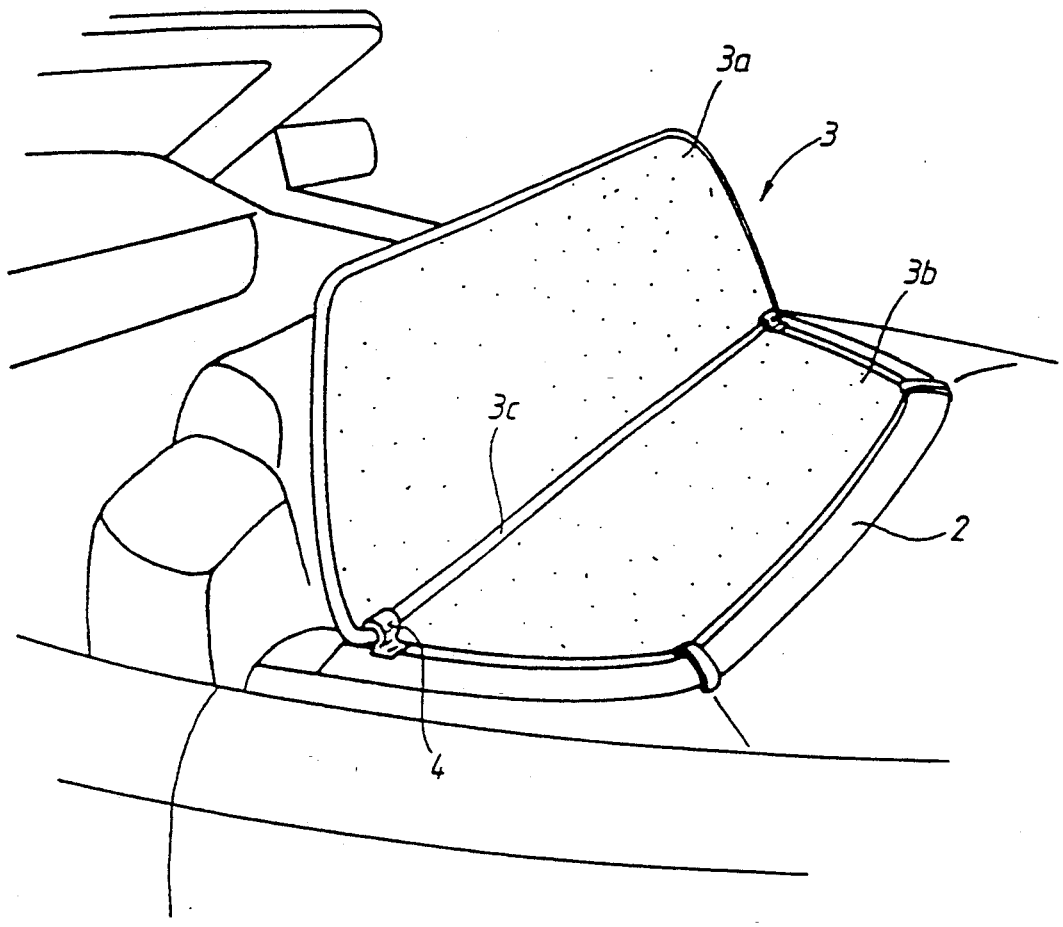
FIG. 3 shows the windscreen arrangement of FIG. 1 in its operating position, the roll bar once again in the position of rest.

The convertible 1 indicated in FIGS. 1 to 3 of the drawing has a roll bar 2 which is pivotable about a transverse axis of the vehicle and which FIGS. 1 and 3 show in its swung-down position of rest and FIG. 2 shows in an intermediate position.

Fastened releasably to the roll bar 2 in a way explained in detail in conjunction with FIGS. 6 and 7 is the second part 3b of a windscreen 3, of which the first part 3a is shown in its swung-up operating position in FIG. 3 and in its stowed position folded rearwards in FIG. 1.

In the exemplary embodiment illustrated in FIGS. 1 to 3, the parts 3a and 3b of the windscreen 3 each consist of a frame covered with a netting.

The second part 3b of the windscreen 3 carries pivot bearings 4 in its corner regions, which pivot bearings 4 are intended for fastening the first part 3a and which can be equipped, for example, with catches for securing the position of rest on the operating position of the first part 3a.

In an arrangement of this type, by means of a conventional drive mechanism, such as can be taken as known, for example, from German Patent Specification 3,732,562, the roll bar 2 and with it the parts 3a and 3b of the windscreen 3 can be pivoted upwards until a person located on a front seat can grasp the first part 3a and engage it in its operating position secured by the catches, while the roll bar 2, together with the second part 3b of the windscreen 3, moves back into its stowed position.

Figure 4:
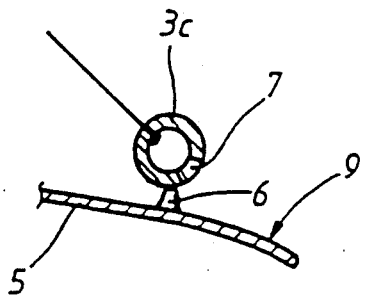
FIGS. 4 and 5 show representations of a simple catch device of the windscreen arrangement of FIGS. 1 and 2, in different pivoting positions of the roll bar or windscreen.
Figure 5:
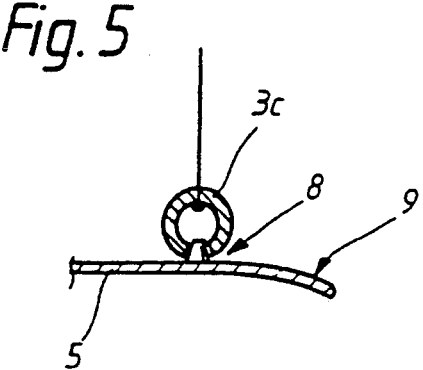
Figure 3:
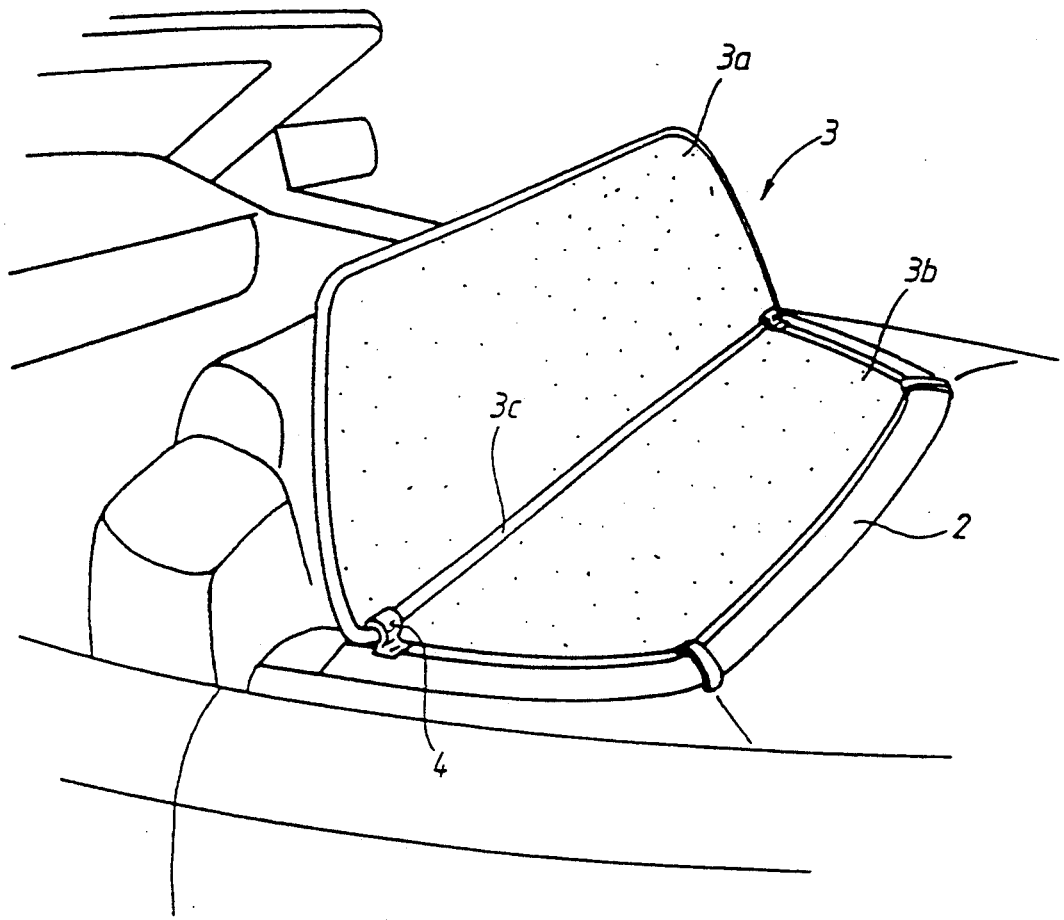
Figure 4:
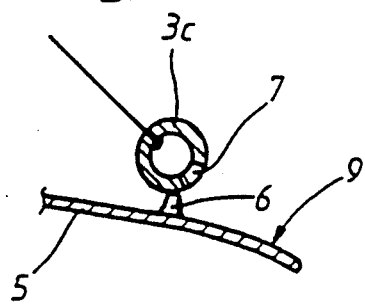
Figure 5:
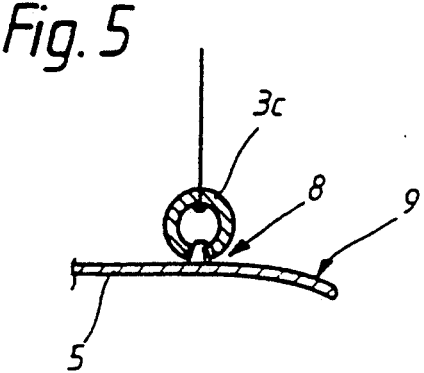

The embodiment indicated diagrammatically by way of example in FIG. 2 and as illustrated in detail in FIGS. 4 and 5, involves a somewhat higher outlay in terms of construction, but is even more convenient to actuate.

In this arrangement, there bears on the lower frame part 3c of the first part 3a of the windscreen 3 a catch stud 6 which is loaded by a leaf spring 5 fastened to the vehicle in a suitable way and which, in a specific angular position of the frame part 3c corresponding to the erected operating position, penetrates into a bore 7 and thereby ensures locking. When the catch device 8 thus provided is effective (FIG. 5), the roll bar 2 can be moved back. The catch device 8 is released by pressing on the free end 9 of the leaf spring 5.

The convertible 11 indicated in FIG. 6 has a roll bar 12 which is pivotable about a transverse axis of the vehicle and which is shown here in its swung-down position of rest.

Fastened to the roll bar 12 is the second part 13b of a windscreen 13, the first part 13a of which is shown in its swung-up operating position. In the exemplary embodiment illustrated in FIGS. 6 and 7, parts 13a and 13b of the windscreen 13 each consist of a frame covered with a netting.

The fastening means arranged on the second part 13b of the windscreen 13 and intended for connecting the latter to the roll bar 12 are shown in more detail in FIG. 7 of the drawing.

Thus, the second part 13b of the windscreen 13 has straps 14 which are fastened to arms 15 projecting rigidly from it and supported at the top on the roll bar 12 located in the position of rest and which are releasably interlockable in the manner of conventional suitcase straps with further arms 16 which point downwards and which are supported on the inner contour of the roll bar.

Furthermore, the second part 13b of the windscreen 13, in its corner regions, carries pivot bearings 17 for fastening the first part 13a, and supporting parts 18 supported on the inner contour of the roll bar 12 project from the region of the pivot bearings 17 and each have at their free ends a angled region 19 for engaging under the roll bar 12.

Moreover, the pivot bearings 17 each have a base region 10 guided out laterally for support on the top side of the roll bar 12.

Although the invention has been described and illustrated in detail, it is to be clearly understood that the same is by way of illustration and example, and is not to be taken by way of limitation. The spirit and scope of the present invention are to be limited only the terms of the appended claims.

What is claimed:

1. A windscreen arrangement for a convertible vehicle having a seat row, comprising an approximately U-shaped roll bar arranged behind the seat row and pivotable about a transverse axis of the vehicle into an approximately horizontal position of rest, a first part pivotable upwards behind the seat row and a second part horizontally covering a space behind the seat row approximately level with a belt line of the vehicle, the two parts being connected pivotably to one another and the first part resting on the second part in the horizontal position of rest, the first part being configured to be brought within proximity to the seat row by raising the roll bar and by pivoting the first part toward the seat row to remain in an engaged position via securing means after lowering the roll bar.

2. A windscreen arrangement for a convertible vehicle having a seat row, comprising an approximately U-shaped roll bar pivotable about a transverse axis of the vehicle into an approximately horizontal position of rest, comprising a first part pivotable upwards behind the seat row into a swung-out operating position and a second part horizontally covering a space behind the seat row approximately level with a belt line of the vehicle, the two parts being connected pivotably to one another and the first part resting on the second part in the horizontal position of rest, and a releasable catch device operatively associated with the vehicle and comprising means for retaining the first part in its swung-out operating position during return movement of the roll bar to the horizontal position of rest, whereby the first part is configured to be brought within proximity to the seat row and into operative connection with the releasable catch device by raising the roll bar and by pivoting the first part toward the seat row to remain in the swung-out operating position after lowering the roll bar.

3. A windscreen arrangement for a convertible vehicle having a seat row, comprising an approximately U-shaped roll bar pivotable about a transverse axis of the vehicle into an approximately horizontal position of rest, a first part pivotable upwards behind the seat row selectively by raising the roll bar and by pivoting the first part toward the seat row to remain in an engaged position via securing means after lowering the roll bar, a second part horizontally covering a space behind the seat row approximately level with a belt line of the vehicle, the two parts being connected pivotably to one another, and means for securing the second part to the roll bar so as to be selectively pivotable upwards together with the roll bar.

4. A windscreen arrangement according to claim 3, wherein an outer contour of the second part is matched to an inner contour of the roll bar.

5. A windscreen arrangement according to claim 3, wherein the securing means comprise straps surrounding the roll bar.

6. A windscreen arrangement according to claim 5, wherein the straps are fastened to arms projecting rigidly from the second part and are supported at the top on the roll bar located in the horizontal position of rest.

7. A windscreen arrangement according to claim 5, wherein the straps are releasably interlockable with arms which point downwards and which are supported on an inner contour of the roll bar.

8. A windscreen arrangement according to claim 6, wherein the straps are releasably interlockable with arms which point downwards and which are supported on an inner contour of the roll bar.

9. A windscreen arrangement according to claim 3, wherein the second part carries pivot bearings at corner regions thereof for securing the first part, and the securing means comprises supporting parts which project from a region of the pivot bearings and are provided at a free end thereof with an angled portion for engaging the first part.

10. A windscreen arrangement according to claim 5, wherein the second part carries pivot bearings at corner regions thereof for securing the first part, and the securing means comprises supporting parts which project from a region of the pivot bearings and are provided at a free end thereof with an angled portion for engaging the first part.

11. A windscreen arrangement according to claim 8, wherein the second part carries pivot bearings at corner regions thereof for securing the first part, and the securing means comprises supporting parts which project from a region of the pivot bearings and are provided at a free end thereof with an angled portion for engaging the first part.

12. A windscreen arrangement according to claim 1, wherein a catch device is operatively associated with the first part to comprise the securing means.

13. A windscreen arrangement according to claim 9, wherein the pivot bearings have a base region guided out laterally for support on a top side of the roll bar.

14. A windscreen arrangement according to claim 10, wherein the pivot bearings have a base region guided out laterally for support on a top side of the roll bar.

* * * * *